Dec. 20, 1966      M. S. BRODRICK      3,292,584
METHOD AND MEANS FOR FEEDING ANIMALS
Filed Dec. 16, 1964
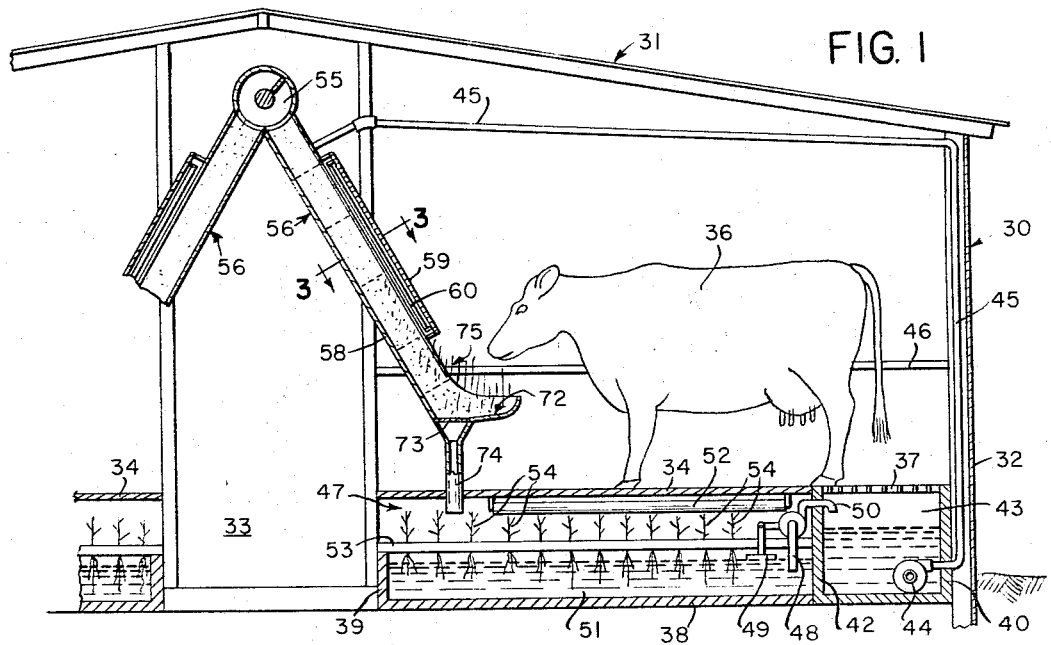
FIG. 1
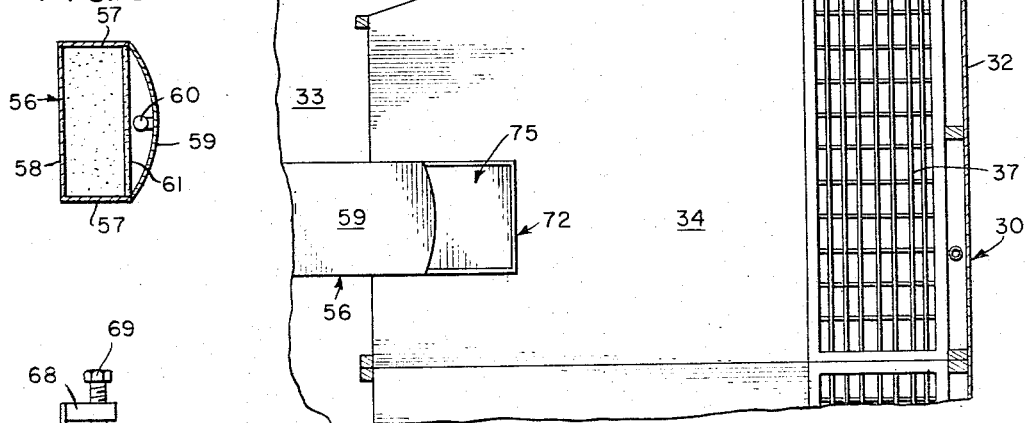
FIG. 2
FIG. 3
FIG. 4     FIG. 5
INVENTOR
MERRILL S. BRODRICK
BY *Sherman Levy*   ATTORNEY United States Patent Office 3,292,584
Patented Dec. 20, 1966

3,292,584
METHOD AND MEANS FOR FEEDING ANIMALS
Merrill S. Brodrick, Mansfield, Pa. 16933
Filed Dec. 16, 1964, Ser. No. 418,661
5 Claims. (Cl. 119—51)

This invention relates broadly to the feeding and handling of animals, such as cows, and more particularly to a method and means wherein the waste such as manure from the animal is utilized to subsequently aid in providing feed for the animals as well as providing a means for facilitating hydroponic plant growth.

The object of the present invention is to provide a method and means, wherein according to the present invention animals such as cows, are supported in elevated position so that they can be conveniently milked, and wherein there is provided an improved means for supplying feed to the animals so that the over-all handling of the animals is accomplished in a most efficient manner.

A further object of the present invention is to provide an integrated food market which includes livestock and produce growing areas which are adapted to utilize hydroponics, and wherein the integrated food market also includes processing and packaging areas, as well as animal slaughtering areas, refrigerated storage areas and a sales area and the like.

Further objects of the present invention will appear more fully hereinafter as the description of the method and apparatus is developed.

In the drawings:

FIG. 1 is a vertical sectional view of a building or enclosure, with parts broken away, illustrating one application of the present invention.

FIG. 2 is a fragmentary top plan view thereof.

FIG. 3 is an enlarged sectional view taken on the line 3—3 of FIG. 1.

FIG. 4 is a view similar to FIG. 3 but illustrating a modification.

FIG. 5 is a schematic view illustrating an integrated food market.

Referring in detail to the drawings, and more particularly to FIGS. 1 through 4 of the drawings, the numeral 30 indicates an enclosure or building which is adapted to include a suitable roof 31 as well as sides or ends 32, and a suitable aisle or passageway 33 may be provided as desired or required, FIG. 1. The numeral 34 indicates a horizontally disposed floor which is adapted to be provided with recesses or cut-away portions 35 that may have a generally V-shape, FIG. 2. As shown in FIG. 1 cows or animals 36 are adapted to be supported on the floor 34. The numeral 37 indicates a grate or reticulated member that is coplanar with the rear portion of the floor 34 so that waste material or cow manure from animals such as the cows 36 will drop onto the pass down through the openings in the grate 37 for a purpose to be later described.

There is further provided a horizontally disposed base member or wall 38 which has front and rear wall portions 39 and 40 extending upwardly therefrom.

The numeral 42 indicates a vertically disposed partition which is arranged as shown in FIG. 1 and the partition 42 coacts with the wall portion 40 to define a tank or compartment 43 that is adapted to receive the manure or waste material from the animal 36. A pump 44 is arranged in the compartment 43, and the numeral 45 indicates a conduit or tube that has its lower end connected to the pump 44 as shown in the drawings. The animals 36 are adapted to be maintained in stalls which may be delineated or defined by members or braces such as those indicated by the numeral 46.

The numeral 47 indicates a tank or compartment which is defined generally between the partition 42 and wall portion 39 below the floor 34, and the compartment 47 has a pump 48 of a suitable construction arranged therein, and the pump 48 may be controlled by a suitable means such as a float control unit 49, and a discharge pipe 50 extends through the partition 42 for discharging liquid 51 from the compartment 47 into the compartment 43. As shown in the drawings a light 52 is suitably supported in the compartment 47, and the light 52 may be connected to a suitable source of electrical energy. The numeral 53 indicates a removable tray which is arranged in the compartment 47, and the tray 53 is adapted to support growing plants, grass or the like as indicated by the numeral 54, and the roots of such plants 54 are adapted to be in contact with the liquid 51 so that by means of hydroponics, the grow of such plants 54 will be taken care of in the most advantageous manner.

There is further provided a conveyor or auger which is indicated generally by the numeral 55, whereby grain or the like can be conveyed or moved from a suitable source of supply into the building 30, and the numeral 56 indicates each of a plurality of generally inclined transparent chutes which depend from the conveyor 55 and which are connected thereto. As shown in FIG. 3 for example, the transparent chutes 56 may each include side sections 57 as well as a wall section 58 and an arcuate wall piece 59, and a light 60 is adapted to be interposed between the wall piece 59 and a transparent member 61, and the light 60 is adapted to be connected to a suitable source of electrical energy, in any suitable manner.

Attention is directed to FIG. 4 of the drawings wherein there is illustrated a modified or alternative type of transparent chute which is indicated generally by the numeral 62, and the chute 62 may be used in places of the chute 56. The chute 62 includes a wall portion 63 as well as a fixed wall 64 and an arcuate wall piece 65 as well as a transparent member 66, and a light 67 is interposed between the members 65 and 66, and the light 67 serves the same purpose as the previously described light 60. The numeral 71 indicates a movable side wall which may be moved or adjusted by rotating a screw member 69 which is suitably supported in a lug or bracket 68 and this arrangement of FIG. 4 thus provides a means for controlling the effective cross-sectional area of the chute 62 so that the rate of flow of the feed can be regulated or controlled by adjusting the screw member 69 to move the wall 71 in or out towards or away from the wall 64.

The lower portion of the chute 56 is shaped to define or provide a feed trough 72 which has a screen or reticulated member 73 therein, and this screen 73 permits excess liquid to flow downwardly therethrough so that such liquid can flow through a discharge pipe 74 into the compartment 47 and be subsequently re-used. The numeral 75 indicates the area or portion of the trough that is cut away or open to permit the animal 36 to readily eat or gain access to the feed in the trough 72.

Attention is now directed to FIG. 5 of the drawings wherein the numeral 76 indicates schematically an integrated food market or the like which may be divided or constructed so that it includes livestock and produce growing areas 77 which utilize hydroponics illustrated in FIG. 1, as previously described. The arrangement 76 is also adapted to include processing and packaging areas such as those indicated by the numerals 78 and 79, as well as an animal slaughering area indicated by the numeral 80, in conjunction with a sales area 81 and a refrigerated storage area 82.

From the foregoing, it will be seen that there has been provided a method of and means for handling animals, such as cows, and in use with the parts arranged as shown in the drawings, it is to be understood that a plurality of animals or cows 36 are adapted to be supported in an enclosure or building such as the building 30. Grain or the like is adapted to be conveyed from a suitable source of supply to the desired location by means of the conveyor or auger 55, and the grain from the conveyor 55 will travel down the inclined transparent chutes 56 by gravity. It is to be understood that a plurality of chutes 56 are adapted to be used so that in effect there will be one chute for each stall area 36, and the grain or material in the chutes 56 is adapted to receive the waste material pumped from the compartment 43 through the conduit 45 by means of the pump 44 and this waste material is intermixed with the grain in the chutes 56 and the intermixed grain and waste material or manure are acted upon by the light 60. The light 60 is able to transmit its rays through the transparent member 61 so that the light can cause or aid in the growth or transformation of the intermixed manure and grain into a final product which is edible and highly beneficial to the animals 36.

The lower portion of the chutes 56 are open as at 75 and wherein there is provided at the lower end of the chutes 56 the trough 72 which permits the animal to eat in a comfortable and highly satisfactory manner. Any excess liquid that finds it way to the trough 72 will drain down through the reticulated or apertured member 73 and pass down through the pipe 74 into the compartment or tank 47 and this liquid is indicated by the numeral 51 in FIG. 1. The liquid 51 is adapted to provide nutrition for the plants 54 which are supported on the tray 53 so that hydroponic growth of such plants 54 can take place, and the light 52 helps insure that this hydroponic growth will take place in the desired manner. The tray 53 may be removably mounted in the tank 47 so that after the plants 54 reach their desired size, the tray 53 can be removed in order to use the grown plants for any desired purpose.

The pump 48 serves to circulate or pump some of the liquid 51 from the tank 47 into the tank 43, and operation of the pump 48 is controlled by means of the float 49 so that when the level of liquid 51 exceeds a predetermined height, the float 49 will be lifted to start the operation of the pump 48 so that excess liquid will be removed from the compartment 47 and pumped into the compartment 43.

Instead of using chutes such as the chutes 56, the chutes 62 can be used and the chutes 62 function in generally the same manner as the previously described chutes 56. However, the chutes 62 include the movable side 71 which can be moved or adjusted by rotating the screw member 69 and this arrangement provides a means for changing the effective cross-sectional area within the chute 62 so that the rate of flow of material downwardly therethrough can be adjusted or regulated as desired or required.

The various parts can be made in different shapes or sizes and any suitable material can be used as desired or required.

Animal waste is adapted to fall through the grate 37 into the tank 43 which is about two-thirds filled with water. This tank 43 has a pump 44 for agitating solution which is diluted to a suitable percentage such as 1 to 2% solids so as to facilitate the pumping operation. Natural cow waste is about 15% solids and is more or less of a slurry and otherwise would be hard to pump and handle. The pipe line 45 goes from the tank 43 to the top of the grass growing and feeder chamber or chute 56. The feeder chamber 56 is adapted to be provided with a full five-day charge and five days permits the grass to sprout in the desired manner. The number of days may be varied from zero to ten by timing of the operation and by varying the size of the chamber as, for example, by using the unit shown in FIG. 4.

The animal 36 is adapted to eat from the area indicated by the numeral 75 and the material in the vicinity of the opening 75 is a combination of grass and feed and this grass is the result of the five-days' growth in the chamber 56. As the cow removes grass and feed, it will be replaced from above by gravity, and suitable graduations or scale markings may be provided adjacent to the transparent chute 56 to provide a means for accurately determining the measurement of added grain. The recessed light 60 aids in growth of the grass in the chamber 56. The chamber or chute 56 is constructed so that air can pass upwardly therethrough to provide oxygen and carbon dioxide for growth of the plants therein. A typical operation which can be manual or automatic with conventional time clocks and other accessories would be on a six to twelve or 24-hour operation. The conveyor 55 may be actuated in any suitable manner to refill the chutes 56, and the conveyor 55 may be automatically stopped when all of the chutes 56 are filled. Then, the pump 44 in the tank 43 would be actuated so as to agitate and pump the nutrient solution through the pipe line 45 to the chamber or chute 56. The nutrient solution is rich in nitrogen, minerals and the like, plus 20 to 40% undigested feed, depending on the cow's diet, and this solution from the pipe 45 will filter down over the grain which is discharged into the chute 56 from the conveyor 55, and the solids will lodge in the grain. The dry grain will absorb moisture so as to start the growth of the grass. The balance of the filtered nutrient solution will pass over the grain to add moisture for growth. Excess filtered solution will leave the bottom of the trough by means of the pipe 74 and will return to the tank 47 as previously described.

The nutritional critical areas of the feed in the trough 72 may and will fall within the scope of prior patent application Serial No. 210,449. The re-use of the 20 to 40% undigested feed in tank 43 is an economic pick-up or added value for this waste feeding system. Any odors which may be present may be chemically masked and each stall is adapted to use the waste from its own stall for the nutrient solution. The waste disposal feeding system is adaped to be used in the tapered V-type stall as described in the prior patent application, Serial No. 321,615, now Patent No. 3,225,789.

A cycle is adapted to be established by the heavy milk producer, namely heavier feed consumption which will move more nutrient solution solids through the system to compensate for heavy milk production. The light milk producer's cycle will be slower in movement and lower in nutrition. Fresh water can be added to the tank 43 by means of conventional float control unit in order to maintain the proper water level in the tank 43.

The feed chamber or trough 72 is arranged as shown in the drawings. The chute or compartment 56 may be horizontally disposed in order to allow for grain expansion after moistening and grass growth and in some instances the chamber may be sloped at a suitable angle such as 60° from the horizontal.

The present invention utilizes a sealed structure having impenetrable exterior insulated area which is sealed against exterior atmosphere, and no air movement through and in and out of the structure is used for environmental control therein and, in addition, windows, air vents and the like are eliminated.

Also the present invention provided a means of maintaining desired levels of temperature, gaseous elements, and humidity in the confined air within the sealed structure by using a cycle of the animal breathing off carbon dioxide for hydroponic plant-grass growth, which throws off oxygen that is used by the animals. Thus, the oxygen level in the structure is supplemented by the oxygen produced by hydroponic plant growth, plus the controlled release of oxygen from commercial tanks in the structure. The temperature to be maintained only needs to compensate for added animal body heat produced within the structure and this is accomplished by an interior liquid cooling system of conduits, whereby cooled air can descend by gravity or force over the animals or objects. In periods of low exterior temperature the animal body heat will heat the structure. The temperature and the humidity are controlled by conduits which have a hot or cold substance flowing therethrough, and also, the conduits have a conventional gutter beneath to catch and guide condensation to a storage tank as reclaimed water. Thus, there is provided a means of controlling the atmospheric environment of animals in a sealed structure in conjunction with hydroponic plant growth. The stall provides means of self-feeding and self-cleaning. In addition, there is provided means of reclaiming water from the air in the structure by condensation of the moisture in the air. There is also provided means of growing nutrients in a milk production habitat, together with a means of animal maintenance within a sealed structure. Further the stall provides means of having exterior enclosing components 31–32 as stall parts. Inasmuch as the stall bed is elevated there is provided an open area beneath the stall bed for placement of piping and equipment. The stall has an exterior enclosing component, and the stall has exterior enclosing means whereby the stall becomes a building section.

The present invention embodies the use of a sealed structure that provides means for air temperature control, hydroponic food growth, waste reclamation and disposal.

In addition, there is a means for a sealed habitat for animals including therein, animal maintenance, production of animal products, processing and packaging of all products pertaining thereto. Further, there is means for a sealed habitat, wherein the interior air and temperature are controlled, and wherein the structure must be well insulated. No air movement in, through, and out of the structure as is now conventional in environmental control methods is used. There is a new means of controlled environment in the structure. Also, there is a means for a structure liquid cooling system to be used, and cool air can descend by gravity or force over the animals or objects. The present invention thus provides a method of feeding animals and hydroponic animal food, and the hydroponic growth of animal food as well as animal waste reclamation by hydroponics. Unlimited quantities of the hydroponic animal food are presented to the animal at the space 75, to which the animal has free access. The animal harvests or forages the hydroponic grain-grass at space 75. The desired stage of maturity of the grain-grass at time of harvest is controlled by chute 62, as shown in FIG. 4.

Furthermore, there is provided a means for reclaiming animal waste, means for disposals of the animal waste, means for hydroponic reclamation of animal waste, means for animal waste reclamation and disposal, and a means for hydroponic growth of animal food in conjunction with animal waste reclamation disposal, and a means for continuous animal self feeding of hydroponically grown foods or feeds and the like.

With the present invention there is provided a means for any type of animal to self feed from the hydroponic growth chamber, and a means for hydroponic growth of animal food in conjunction with animal waste reclamation and disposal. Also, the present invention provides for reclamation of undigested food nutrients in the animal's waste material and a means of using the animal's waste material as a nutrient for the hydroponic growth of the animal food. In addition there is provided a means for grain sprouting and hydroponic growth of grass in conjunction with animal self feeding and there is also provided a means for removing the animal's waste from the immediate area of the animal.

The hydroponic growth chamber provides a means for reclaiming the undigested food nutrients in the animal waste as well as a means for using the animal waste material as a growth nutrient, and permits the animal to self feed therefrom, and also permits and provides for grain sprouting and growth of grass, and also vitamins, minerals, enzymes, nutrients and unknown grass factors can be conveniently added to the initial grain.

The tank or chamber 47 can be used for growing vegetables. The present invention also provides a means for maintaining adequate levels of oxygen in an enclosed habitat, as well as hydroponic means for consuming and disposing of carbon dioxide in an enclosed habitat.

With further regard to the chamber or chute 56, the grain or grass food will move down by gravity and in order to compensate for wet grain expansion and growth of grass, the angle of the chute 56 with respect to the floor can be varied as desired or required.

There is also provided an integrated milk marketing system providing means for improved complete permanent cow confinement and care. Also there is provided controlled milk solids by fully controlled nutritional programs utilizing one feed, and daily veterinarian supervision can be efficiently brought about, and also there is a shorter period of time from the cow producing the milk and having the milk packaged. Also, an improved milk product is produced as to quality and sanitation. Also there will be no time lag before pasteurization and packaging.

There is also provided a centralized controlled dairy establishment with a stricter herd-health supervision, together with year-round nutritional programs, and elimination of field inspections and drayage.

Thus, there is provided a method of producing quality controlled milk with complete cow confinement and completely controlled constant cow nutritional programs. There is also a vertically integrated operation as well as the elevated cow floors which provide increased operation as well as the elevated cow floors which provide increased sanitation, and the closed animal waste disposal system. The grass can be produced throughout the year and thus throughout the year milk will be produced from cows that consume grass in the winter, summer and the like.

The dairy establishment provides means for an improved milk that has controlled solids, controlled flavor and wherein sanitation is controlled. Also, there is provided improved animal care with the caged or confined cows or animals and wherein there is the controlled environment and animal self feeding arrangement. Also there is improved animal nutritional programs with constant nutritive ratio, and there is also the hydroponic forage growth, and the animal waste disposal as previously stated.

The present invention has the stall arrangement which provides means for the hydroponic growth of grain-grass therein, the self feeding of the animals, and the waste disposal and by diluting the waste material and applying it to the grain bed, sprouting of the grass is stimulated. Also, waste is dissipated by filtering it over the grain bed as a nutrient for the grass to grow, and the solids are filtered into the grain bed and consumed by the cows. The animals 36 are maintained in an elevated position by means of the elevated floor 34 so that a person can readily gain access to the cows in an elevated position.

The open V-shaped recess 35 is adapted to extend far enough back towards the grate 37 so as to permit persons to get far enough back to easily milk the cows. In the tank 47, additional vegetation and perhaps fish may be grown. In some instances the partition 42 between tanks 47 and 43 may be removed so as to provide one large area or tank.

The present invention provides a new non-conventional means for inside environmental control. Walls and ceilings are adapted to be made impermeable so that windows, air vents, fan openings and the like are eliminated.

With the present invention, there is provided a method of insuring that the animals will have fresh green grass regardless of the weather or season or location, and the present invention will lower feed costs and increase profits.

The present invention includes a structure which provides a means for confining nuisance odors within its confines, and a structure means providing livestock housing and maintenance in populous areas. Also, there is a means for providing a populous area integrated cash and carry merchandising system for agricultural food products. The structure can be arranged in populated urban areas to provide direct to the consumer perishable food products with original farm-fresh properties. Also, there is the structure which is sealed against exterior atmosphere, and which provides a means for controlling the environment therein. The temperature to be maintained only needs to compensate for added body heat produced within the structure and this is accomplished by interior cooling. The oxygen level in the structure is supplemented by the oxygen produced by hydroponic plant growth, plus when necessary, the controlled release of pure oxygen from commercial tanks in the structure. In periods of low temperature, the body heat will heat the structure. The structure provides means therein for bringing together the necessary elements to grow, produce, process, package and merchandise therefrom, agricultural food products.

The stalls incorporate dairy cow self feeding, together with means for milking the cows in elevated positions, waste removal from the cows' area, use of waste for nutrient growth, and increased feed efficiency by the use of undigested waste, grass enzyme factors, and continuous access by the cows.

The grain conveyor 55 may run for four to six hours intervals for refilling the top of the feeders 56, and this may be followed by running of the waste tank pump 44 to filter the waste solution over the dry grain in the chute 56 to initiate sprouting. Excess filtered nutrient solution is returned to the tank 47 by means of the pipe 74. Waste odors are reduced by submersion in the tank. Additives may be used on the grain or in the tank to mask odors and flavors. Suitable lines or conduits may be arranged below the floor 34 and, for example, such lines may include milk lines, water lines, vacuum lines and the like.

With further reference to the arrangement shown in FIG. 5, there is illustrated schematically a structure which provides environmental means for year-round growing of agricultural products including out of season products. The area 77 may consist of a livestock and produce growing area which utilizes hydroponics, and may include elevated stalls, pens and cages as well as the self feeding hydroponic waste reclamation means. FIG. 5 shows only the required areas and specific arrangements or sizes can be varied as desired or required. Livestock in the area 77 may include dairy and beef cattle, hogs, sheep and poultry, and each of these may be kept in separate compartments or barn areas.

The tray 53 may support seeds thereon which subsequently become plants, and the liquid 51 may be filtered nutrient solution. The pump 48 is adapted to maintain the level of the solution 51 at the proper height. The tank or compartment 47 thus consists of a hydroponic growing tank for plants and vegetables, and wherein there is utilized the filtered overflow nutrient solution from the chute 56 which will be strong enough to support growth in the tank 47. The plant growth in the units 56 and 47 will utilize carbon dioxide expelled by the animals, giving off oxygen for the animals. In a building such as that described in the present application, there is controlled environment and plant photosynthesis which will supply needed animal oxygen. The temperature and humidity may be controlled by piping which has a hot or cold substance flowing therethrough.

The present invention is not limited to cows since it is applicable to all types of livestock, poultry and domestic animals. When necessary, additives may be added to the liquid 51 in tank 47 reducing excessive nitrogen content of the liquid 51 in the hydroponic system. The present invention is a cyclic arrangement and the only thing that is added is feed and water and in addition the present invention provides a convenient waste disposal system.

The conveyor 55 delivers grain to the chutes 56 and the conveyor 55 may be operated at periodic intervals to properly fill the chutes 56 with grain. The waste material from the cows will drop down through the grate 37 into the tank 43, and periodically material is pumped from the tank 43 through the pipe or conduit 45 to the top of the chute 56 to provide fertilizer and moisture for the grain, whereby the light 60 will stimulate growth so that the grain will sprout and the grass will grow in the chute 56 whereby by the time the material reaches the lower end of the chute 56, the grass will have sprouted so that the cow will have the benefit of the grain plus the benefit of eating green grass.

Excess liquid drops down through the pipe 74 into the tank 47 and the tray 53 has grass or grain thereon, and this grass or grain will sprout and there is the light 52 to provide the necessary light rays for proper growth of the plants 54.

The present invention is thus a self-contained arrangement which minimizes the need for outside materials, and the waste material or manure from the cows will act as fertilizer to help the grain and grass to grow or sprout.

In addition, the structure provides a consumer means of acquiring farm fresh products at point of production, amid populous areas. Also, there is provided means for the movement of food products directly from producer to consumer, and hence there is provided a fresher product. Also, there is an elimination of time and transportation between the producer and consumer. Thus, fresh products are moved in a desired state of maturity perfection and development. With regard to the sealed structure, there is provided means for aseptic techniques for the livestock and products.

It will be seen that according to the present invention there is provided an air-tight structure which provides a self-contained means for atmospheric environmental controls therein, as well as an air-tight structural means permitting the hydroponic growth of plants therein, and an air-tight structural means providing for vertically integrated merchandising of agricultural food products, and there is also an air-tight structure providing means for animate existence therein, and an air-tight structural means providing hydroponic waste reclamation and disposal. Also, there is provided structural means providing therein vertical integration marketing means for agricultural food products, and a method of animal feeding utilizing animal waste material, and an air-tight structure means providing integrated means therein for bringing together necessary elements to grow, produce, process, package, and merchandise therefrom agricultural food products.

Minor changes in shape, size and rearrangement of details coming within the field of invention claimed may be restorted to in actual practice, if desired.

What is claimed is:

1. In a cow handling arrangement, means for supporting the cows on an elevated position, grate means adapted to have waste material from the cows pass therethrough, a tank below said grate means, a pump in said tank, conduit means connected to said pump, a conveyor for moving grain from a source of supply to the vicinity of the cows, inclined chutes connected to said conveyor and said inclined chutes having said conduit means connected thereto, a light contiguous to said chutes, pipe means at the lower end of said chutes, and a compartment having said pipe means communicating therewith and said compartment adapted to have a tray means therein for supporting plants.

2. A method of handling animals comprising the steps of collecting waste from the animals, diluting the waste with liquid, pumping and circulating the waste and intermixing the waste with grain, subjecting the intermixed waste and grain to the action of light, presenting to the animals to eat the resulting product that results from the intermixed grain and waste, removing excess liquid from the feed product, and utilizing the excess liquid to support plant growth hydroponically while subjecting the same to the action of light rays.

3. In a device of the character described, an enclosure including a horizontally disposed floor having generally V-shaped recesses therein, said floor adapted to support animals thereon, grates coplanar with the rear portion of the floor, said enclosure further including a horizontally disposed base member below sail floor, upwardly extending front and rear wall portions contiguous to the front and rear of said base member, a vertically disposed partition extending between said base member and said floor and defining a first compartment below said grate for receiving waste material from the animals, a pump in said first compartment, a conduit connected to said pump, a second compartment defined below said floor between said partition and said front wall portion, a pump in said second compartment, a float mechanism for controlling operation of said last named pump, a tray in said second compartment for supporting plants which are to be grown hydroponically, a light in said second compartment, said second compartment adapted to have a quantity of liquid therein, a conveyor for moving grain from a source of supply, inclined chutes connected to said conveyor, an inlet connection from said conduit in said chutes, lights adjacent said chutes, the lower portion of said chutes each defining a trough, and a discharge pipe depending from said trough and communicating with said second compartment.

4. A method of animal self-feeding within a structure enclosed against exterior atmosphere, comprising a provision of means of hydroponic plant growth within said structure, and also providing a cooling agent, and providing a constant moisture within said habitat, and further providing a gaseous element releasing means operated in conjunction with the animal and plant areas providing means for producing the desired levels of atmosphere within said structure, collecting waste material from the animals, diluting the waste material with liquid and combining the diluted waste material with nutrient ingredients and presenting the same to the animals to be eaten.

5. A method of animal feeding comprising the steps of collecting animal wast material, diluting the waste material with liquid, combining said diluted animal waste material with nutrient ingredients and presenting to the animal to eat the resulting intermixed food.

References Cited by the Examiner
UNITED STATES PATENTS

| | | | |
|---|---|---|---|
| 1,793,626 | 2/1931 | McCormick | 47—17 |
| 2,081,947 | 6/1937 | McCornack | 119—14.03 |
| 2,222,310 | 11/1940 | Emery | 47—1.2 X |
| 2,358,000 | 9/1944 | Cornell | 119—16 X |
| 2,616,809 | 11/1952 | Graves | 99—183 |
| 2,825,300 | 3/1958 | Carlson | 119—27 X |
| 3,191,577 | 6/1965 | McMurray | 119—28 X |

SAMUEL KOREN, *Primary Examiner.*

ALDRICH F. MEDBERY, *Examiner.*